United States Patent
Chen et al.

(10) Patent No.: US 10,411,225 B2
(45) Date of Patent: Sep. 10, 2019

(54) POWER BATTERY AND CAP STRUCTURE OF THE POWER BATTERY

(71) Applicant: Contemporary Amperex Technology Co., Limited, Ningde, Fujian (CN)

(72) Inventors: Baisong Chen, Ningde (CN); Peng Wang, Ningde (CN); Kai Wu, Ningde (CN); Zhiyu Wang, Ningde (CN); Xiaobo Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 138 days.

(21) Appl. No.: 15/649,953

(22) Filed: Jul. 14, 2017

(65) Prior Publication Data

US 2018/0233716 A1    Aug. 16, 2018

(30) Foreign Application Priority Data

Feb. 14, 2017  (CN) .......................... 2017 1 0078707

(51) Int. Cl.
  *H01M 2/04*  (2006.01)
  *H01M 2/34*  (2006.01)
  (Continued)

(52) U.S. Cl.
  CPC ......... *H01M 2/0456* (2013.01); *H01M 2/043* (2013.01); *H01M 2/0404* (2013.01);
  (Continued)

(58) Field of Classification Search
  CPC .... H01M 2/345; H01M 2/348; H01M 2/0456; H01M 2/0404; H01M 2/0426; H01M 2/043; H01M 2/0443; H01M 2/0478; H01M 10/02; H01M 10/04; H01M 2200/103; H01M 2200/20
  See application file for complete search history.

(56) References Cited

U.S. PATENT DOCUMENTS

| | | | |
|---|---|---|---|
| 2004/0170887 A1* | 9/2004 | Masumoto | H01M 2/0404 429/61 |
| 2005/0083166 A1* | 4/2005 | Senda | C22C 28/00 337/159 |

(Continued)

OTHER PUBLICATIONS

The extended European search report dated Sep. 20, 2017 for European Application No. 17181257.1, 4 pages.

*Primary Examiner* — Gregg Cantelmo
(74) *Attorney, Agent, or Firm* — Law Offices of Liaoteng Wang

(57) ABSTRACT

A cap structure of a power battery includes first and second electrode components, a cap plate attached to the first and second electrode components, and a turnable plate connected to the second electrode component. The first electrode component is electrically isolated from the cap plate and includes a first terminal and a first connecting block. The first connecting block is located above the cap plate and includes a terminal connecting portion, a fusing portion, and a turnable plate connecting portion. In case that an internal pressure of the power battery exceeds a reference pressure, the turnable plate is turned over and in contact with the turnable plate connecting portion, such that the first terminal is electrically connected to the second electrode component.

17 Claims, 4 Drawing Sheets

(51) Int. Cl.
*H01M 10/02* (2006.01)
*H01M 10/04* (2006.01)

(52) U.S. Cl.
CPC ....... *H01M 2/0426* (2013.01); *H01M 2/0443* (2013.01); *H01M 2/0478* (2013.01); *H01M 2/345* (2013.01); *H01M 2/348* (2013.01); *H01M 10/02* (2013.01); *H01M 10/04* (2013.01); *H01M 2200/103* (2013.01); *H01M 2200/20* (2013.01)

(56) References Cited

U.S. PATENT DOCUMENTS

| | | | |
|---|---|---|---|
| 2013/0017420 A1* | 1/2013 | Byun | H01M 2/26 429/61 |
| 2013/0196179 A1* | 8/2013 | Han | H01M 2/04 429/7 |
| 2015/0099148 A1 | 4/2015 | Han | |
| 2015/0263396 A1 | 9/2015 | Kitamura et al. | |

* cited by examiner

POWER BATTERY AND CAP STRUCTURE OF THE POWER BATTERY

CROSS-REFERENCE TO RELATED APPLICATION

This application is based upon and claims priority to Chinese Patent Application No. 201710078707.8, filed on Feb. 14, 2017, the content of which is incorporated herein by reference in its entirety.

FIELD

The present disclosure generally relates to energy storage devices, and more particularly, to a power battery and a cap structure of the power battery.

BACKGROUND

Due to the merits of high energy density, high power density, large number of charge cycles, and long storage time, power batteries (for example, lithium-ion batteries) have been widely used in portable electronic devices such as mobile phones, digital cameras, hand-held computers and etc., and also have promising applications in aspects of electricity driven transportation devices such as electric vehicles and electric bicycles, and large and medium sized electric equipment such as power storage facilities and etc. The power batteries may become the key to solve global issues such as energy crisis and environmental pollution.

When a power battery is overcharged, the electrolyte decomposition in the power battery may result in an increased pressure inside the power battery, which may cause fire and explosion of the power battery. In order to prevent the fire and explosion caused by the increased internal pressure, an external short circuit unit is generally required for the power battery. When the internal pressure of the power battery increases, the external short circuit unit may generate a short circuit between positive and negative electrode plates of a bare cell and an outer portion of the power battery, and thus the charging of the bare cell may be suppressed.

However, the above structure would reduce the performance of the power battery under high-temperature environment. For example, when doing a Hot-Box test with the above structure, a probability of thermal runaway for the power battery may largely increase. The specific reason may be: under high-temperature environment, not only the internal pressure of the power battery increases with the electrolyte decomposition under high-temperature, but also an internal impedance of the bare cell increases. In this case, if a turnable plate is reversed such that the positive electrode plate and the negative electrode plate of the power battery form an external short circuit, more heat will be generated within the bare cell because of the increased internal impedance and short-circuit current, which may further intensify the risk of fire and explosion of the power battery. In other words, the external short circuit unit may solve only the overcharge problem of the power battery under normal temperature, but would increase the thermal runaway probability of the power battery in high-temperature environment.

SUMMARY

The present disclosure provides a power battery and a cap structure of the power battery.

According to a first aspect of the present disclosure, there is provided a cap structure of a power battery, including a first electrode component, a second electrode component, a cap plate, and a turnable plate, wherein: the first electrode component and the second electrode component are attached to the cap plate, and the first electrode component is electrically isolated from the cap plate; the first electrode component includes a first terminal and a first connecting block, the first connecting block is located above the cap plate, the first connecting block includes a terminal connecting portion, a fusing portion, and a turnable plate connecting portion, the terminal connecting portion is connected to the turnable plate connecting portion through the fusing portion, the first terminal is connected to the terminal connecting portion, the fusing portion has a melting point lower than that of the terminal connecting portion or the turnable plate connecting portion, and the turnable plate is electrically connected to the second electrode component; and in case that an internal pressure of the power battery exceeds a reference pressure, the turnable plate is turned over and in contact with the turnable plate connecting portion, such that the first terminal is electrically connected to the second electrode component.

According to a second aspect of the present disclosure, there is provided a power battery, including a housing, a bare cell, and the above described cap structure of the power battery, wherein: the housing accommodates the bare cell; the cap structure covers an opening of the housing; and the bare cell has two electrodes having opposite polarities, one of the two electrodes is electrically connected to the first terminal, and the other one of the two electrodes is electrically connected to the second electrode component.

It is to be understood that both the forgoing general description and the following detailed description are only exemplary, and do not limit the present disclosure.

REFERENCE NUMERALS

1—cap structure
10—first electrode component
  100—first terminal
  102—first sealing element
  104—first connecting block
    104a—riveting element
    1040—terminal connecting portion
      1040a—first ridge
    1042—fusing portion
      1042a—first groove
      1042b—second groove
    1044—turnable plate connecting portion
      1044a—second ridge
    1046—clearance hole
  106—first upper insulating element
    1060—turnable plate through hole
    1062—restriction portion/shield
  108—first lower insulating element
12—second electrode component
  120—second terminal
  122—second sealing element
  124—second connecting block
  126—second lower insulating element
  128—sealing ring
14—cap plate
  140—turnable plate connecting hole
  142—turnable plate through hole
  144—injecting hole
  146—anti-explosion hole
16—turnable plate
2—bare cell
2a—positive electrode tab
2b—negative electrode tab
3—housing
4—first connecting element
5—second connecting element
6—fusing member The accompanying drawings, which are incorporated herein and form a part of the specification, illustrate embodiments in accordance with the present disclosure and, together with the description, further serve to explain the principles of the present disclosure.

DETAILED DESCRIPTION

The present disclosure will be further described in detail below by the specific embodiments in combination with the accompanying drawings. As used herein, terms "front", "back", "left", "right", "upper", and "lower" are referred with reference to the cap structure of the power battery shown in the figures.

Figure 1:
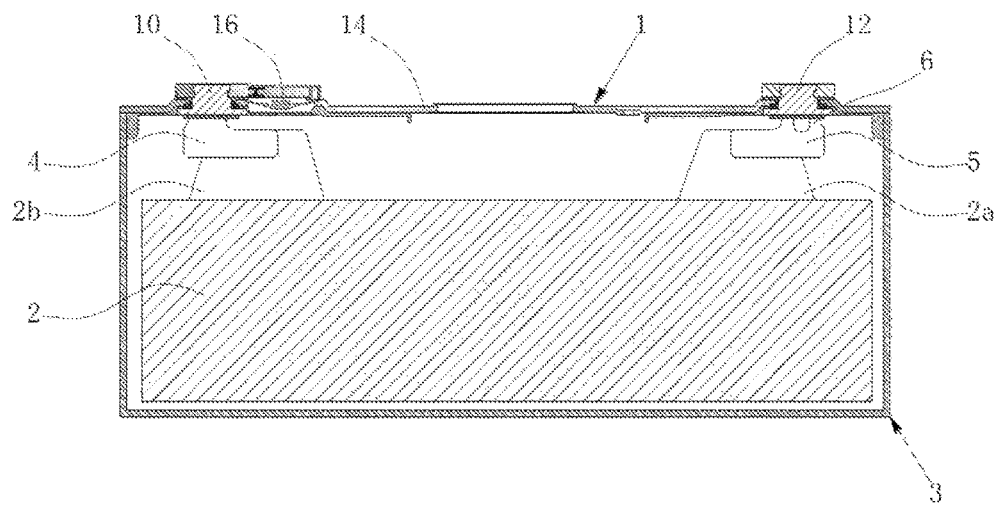
FIG. 1 is a side cross-sectional structure diagram of a power battery with a turnable plate disposed on a cap plate, according to embodiments of the present application.
Figure 4:
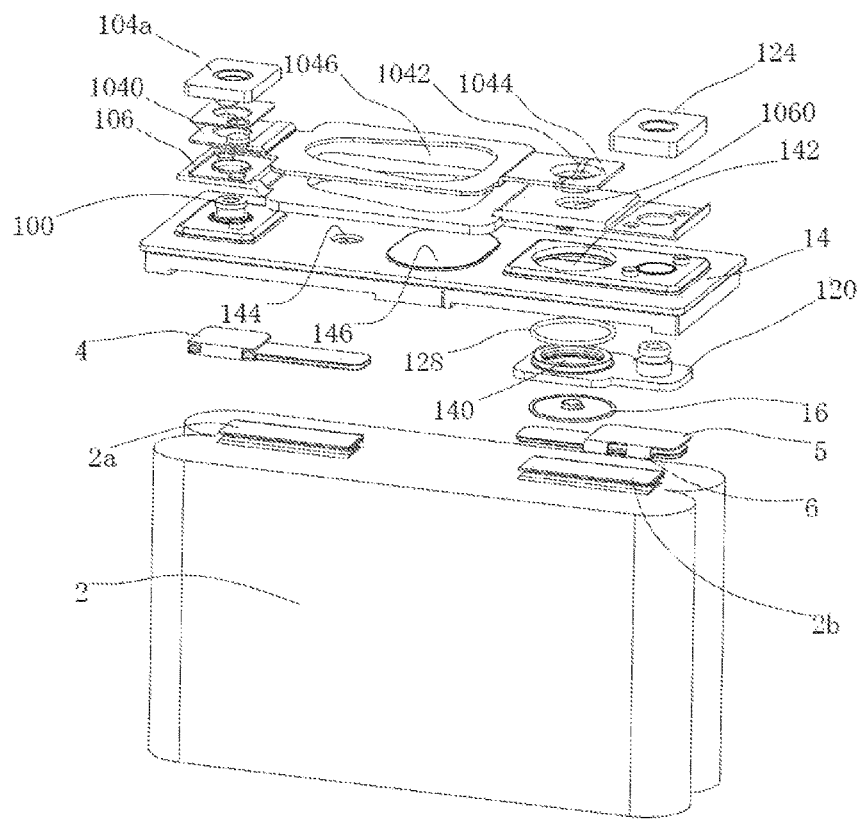
FIG. 4 is an exploded structure diagram of a power battery with a turnable plate disposed on a second terminal, according to embodiments of the present application.

A power battery is provided in an embodiment of the present disclosure. As shown in FIGS. 1 and 4, the power battery may include a cap structure 1, a bare cell 2, a housing 3, a first connecting element 4, and a second connecting element 5. The bare cell 2 is generally formed by winding or stacking a positive electrode plate, a negative electrode plate and a separator. A positive electrode tab 2a and a negative electrode tab 2b are extended out of the positive electrode plate and negative electrode plate, respectively. The housing 3 is usually made of metal materials, and together with the cap structure 1, forms a cavity for accommodating the bare cell 2. Thus the bare cell 2 is placed within the cavity.

Figure 5:
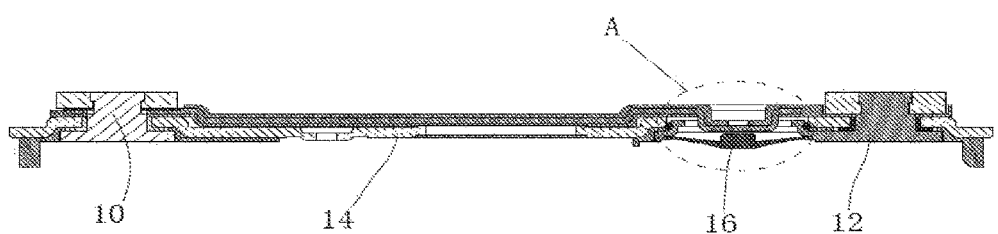
FIG. 5 is a side cross-sectional structure diagram of a cap structure of a power battery with a turnable plate disposed on a second terminal, according to embodiments of the present application.

As shown in FIGS. 1 and 5, the cap structure 1 includes a first electrode component 10, a second electrode component 12, a cap plate 14, and a turnable plate 16. In an example, both the first electrode component 10 and the second electrode component 12 are attached to the cap plate 14, and one of the first electrode component 10 and the second electrode component 12 is connected, through the first connecting element 4, to the positive electrode tab 2a or the negative electrode tab 2b of the bare cell, while the other one of the first electrode component 10 and the second electrode component 12 is connected, through the second connecting element 5, to the other electrode tab of the bare cell. For example, as shown in FIG. 1, the first electrode component 10 is electrically connected to the negative electrode tab 2b of the bare cell 2 through the first connecting element 4, while the second electrode component 12 is electrically connected to the positive electrode tab 2a of the bare cell 2 through the second connecting element 5, such that the positive and negative electrodes of the power battery are respectively protruded. As also shown in FIGS. 4 and 5, the first electrode component 10 is electrically connected to the positive electrode tab 2a of the bare cell 2 through the first connecting element 4, while the second electrode component 12 is electrically connected to the negative electrode tab 2b of the bare cell 2 through the second connecting element 5.

As shown in FIGS. 2 to 6, the first electrode component 10 includes a first terminal 100, a first sealing element 102, a first connecting block 104, a first upper insulating element 106, a first lower insulating element 108, etc. In the embodiments, the first connecting block 104 may include a terminal connecting portion 1040, a fusing portion 1042 and a turnable plate connecting portion 1044, wherein the terminal connecting portion 1040 is connected to the turnable plate connecting portion 1044 through the fusing portion 1042. The fusing portion 1042 may have a melting point lower than that of the terminal connecting portion 1040 or the turnable plate connecting portion 1044.

The first connecting block 104 may be located above the cap plate 14, and the first upper insulating element 106 may be located between the first connecting block 104 and the cap plate 14 to electrically isolate the first connecting block 104 from the cap plate 14. Meanwhile, the first upper insulating element 106 may have a turnable plate through hole 1060, and the turnable plate connecting portion 1044 may be exposed from the turnable plate through hole 1060.

The terminal connecting portion 1040 is used for connecting the first terminal 100. More particularly, the first terminal 100 may pass through the first sealing element 102, the cap plate 14 and the first upper insulating element 106, and be fixed with the terminal connecting portion 1040 by means of riveting or soldering, etc, which also forms an electrical connection relationship between the terminal connecting portion 1040 and the first terminal 100, such that an electric conduction is achieved between the negative electrode of the power battery and the first connecting block 104. The first lower insulating element 108 may isolate the first terminal 100 from the lower surface of the cap plate 14, to prevent them electrically connecting to each other.

Figure 2:
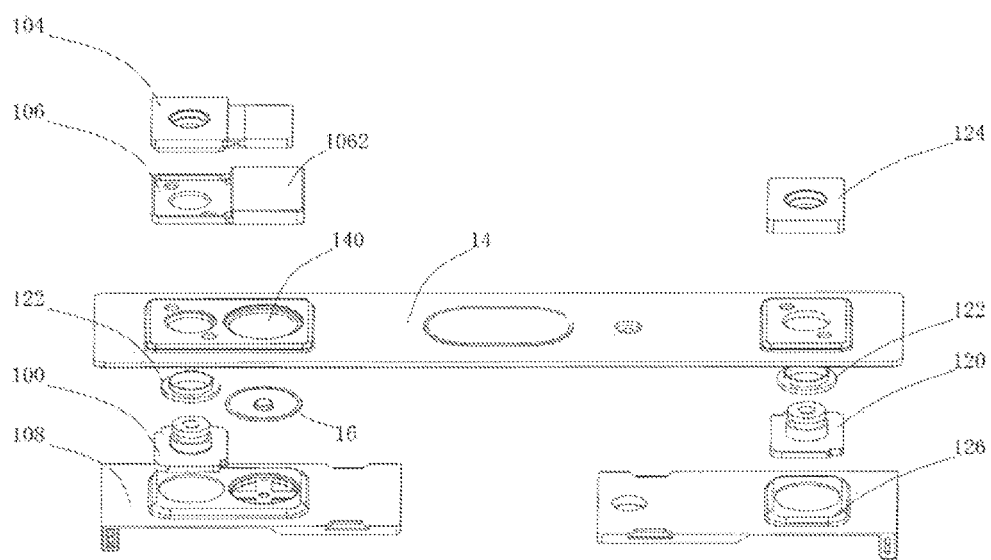
FIG. 2 is an exploded structure diagram of a cap structure of a power battery with a tunable plate disposed on a cap plate, according to embodiments of the present application.
Figure 3:
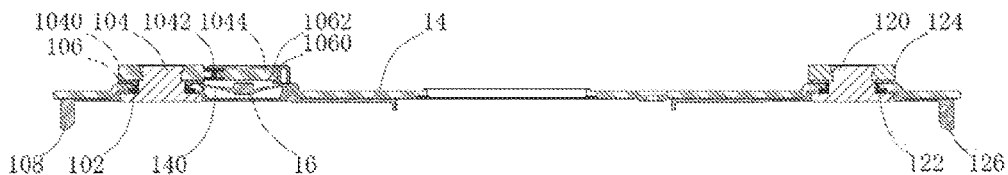
FIG. 3 is a side cross-sectional structure diagram of a cap structure of a power battery with a tunable plate disposed on a cap plate, according to embodiments of the present application.

As shown in FIGS. 2 to 3, the second electrode component 12 includes a second terminal 120, a second sealing element 122, a second connecting block 124, a second lower insulating element 126, etc. In the embodiments, the second sealing element 122 and the second lower insulating element 126 may be located between the second terminal 120 and the lower surface of the cap plate 14, and the second connecting block 124 may be located above the cap plate 14. A top end of the second terminal 120 may pass through the second sealing element 122 and the cap plate 14, and be connected to the second connecting block 124 by means of riveting or soldering, etc, which also makes the second connecting block 124, the second sealing element 122 and the second lower insulating element 126 clamped and/or secured together.

In the embodiments, both the first electrode component 10 and the second electrode component 12 may have an insulated connection with the cap plate 14. However, in order to prevent corrosion of the cap plate 14 and the housing 3, the positive electrode of the power battery usually is electrically connected to the cap plate 14, such that the cap plate 14 and the housing 3 are positively charged to prevent corrosion. Thus, when the first electrode component 10 or the second electrode component 12 is connected to the positive electrode tab 2a, the first electrode component 10 or the second electrode component 12, which is connected to the positive electrode tab 2a, may be electrically connected to the cap plate 14. Alternatively, the first terminal 100 or the second terminal 120 may be directly integrated on the cap plate 14, such that the cap plate 14 is positively charged.

In the embodiments, the turnable plate 16 may be set on the cap plate 14, and may also be set on the second terminal 120. These two setting modes will be respectively described as follows.

As shown in FIG. 2 and FIG. 3, in a case of the turnable plate 16 being set on the cap plate 14, a turnable plate connecting hole 140 is disposed on the cap plate 14, and the turnable plate connecting hole 140 is sealed by the turnable plate 16, such that the upper and lower sides of the turnable plate 16 are under different pressure conditions respectively. In the meantime, the turnable plate 16 also keeps electrical connection with the second electrode component 12. Usually, in order to prevent corrosion of the cap plate 14 and the housing 3, the positive electrode of the power battery will be electrically connected to the cap plate 14. In such a situation, it is only required to electrically connect the turnable plate 16 to the turnable plate connecting hole 140 to ensure that the turnable plate 16 always has an electrical connection with the second electrode component 12.

Figure 6:
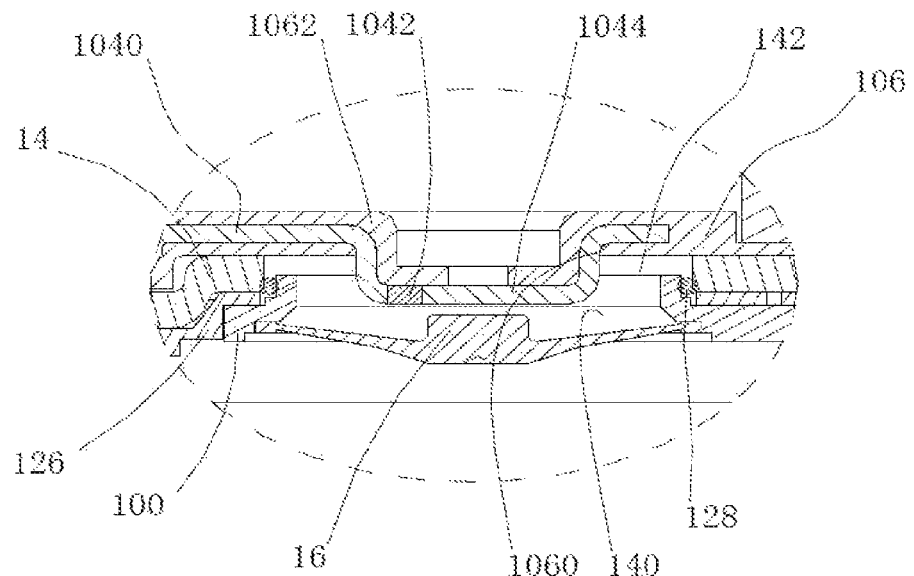
FIG. 6 is an enlarged view of a portion A in FIG. 5.

As shown in FIGS. 4 to 6, in a case of the turnable plate 16 being set on the second terminal 120, the turnable plate connecting hole 140 is disposed on the second terminal 120. In this case, the cap plate 14 has a turnable plate through hole 142, the turnable plate connecting portion 1044 is located above the turnable plate connecting hole 140, and the turnable plate through hole 142 is aligned with the turnable plate connecting hole 140. The turnable plate 16 seals the turnable plate connecting hole 140 and is electrically connected to the turnable plate connecting hole 140. In the meantime, the space within the turnable plate through hole 142 is also relatively independent from the space below the turnable plate 16 (i.e., a cavity space accommodating the bare cell 2), rather than being connected to each other, so as to prevent air or electrolyte from reaching inside the turnable plate through hole 142 from the internal space of the power battery to cause that a pressure difference cannot be formed between two sides of the turnable plate 16 or that the electrolyte may be leaked outside the power battery through the turnable plate through hole 142. Typically, the sealing may be achieved by disposing a sealing structure such as a sealing ring 128 surrounding the turnable plate through hole 142 between the second terminal 120 and the cap plate 14, such that these two spaces are independent from each other. Certainly, disposing a sealing structure at other places is not excluded from the present application.

Usually, the first electrode component 10 and the second electrode component 12 may be located at two ends of the cap plate respectively. Thus, in this case, the first connecting block 104 is required to reach nearby the second electrode component 12 to be located above the turnable plate 16. However, structures such as an injecting hole 144, an anti-explosion hole 146 etc. are usually set in the middle of the cap plate 14. In order not to impede normal operation of the injecting hole 144 and the anti-explosion hole 146, structures such as a clearance hole 1046 need to be set on the first connecting block 104 to prevent the injecting hole 144 and the anti-explosion hole 146 from being blocked. Also, for the purpose of convenient assembling, an individual riveting element 104a may be designed for the first connecting block 104. The riveting element 104a is used for riveting with the first terminal 100 and also for fixing other parts of the first connecting block 104.

Besides, in this case, the first upper insulating element 106 in the embodiments may also act as an insulating element for insulating the second connecting block 124 from the cap plate 14 (referring to FIG. 4).

Under normal situations, external electric equipment (not shown in the Figures) is connected to the first electrode component 10 and the second electrode component 12 respectively. Accordingly, it is allowed to form an electricity output loop from the positive electrode tab 2a, through the second connecting element 5, the second electrode component 12, the external electric equipment, the first electrode component 10, and the first connecting element 4, to the negative electrode tab 2b, to supply electrical energy of the bare cell 2 to the external electric equipment.

When the power battery is being over-charged, a large amount of gas or thermal will be generated inside the power battery, which may dramatically increase the internal pressure of the power battery. When the internal pressure of the power battery exceeds a reference pressure for overturning the turnable plate 16, the turnable plate 16 can be turned up and thus be in contact with the turnable plate connecting portion 1044 to form an electrical connection, such that the power battery may have a short-circuit loop that begins at the positive electrode, passes through the positive electrode tab 2a, the second connecting element 5, the second electrode component 12, the cap plate 14, the turnable plate 16, the turnable plate connecting portion 1044, the fusing portion 1042, the terminal connecting portion 1040, the first terminal 100, the first connecting element 4, and the negative electrode tab 2b, and ends at the negative electrode. Accordingly, a short-circuit current may be generated. When the short-circuiting occurs, due to an instantaneous (or substantially instantaneous) and large current flow between the positive electrode and the negative electrode, the bare cell 2 is thus discharged and the over-charging of the power battery can be efficiently suppressed.

However, when the over-charging is too serious, it is possible that the over-charging cannot be suppressed only by discharging. Accordingly, in the embodiments of the present disclosure, a notch or a hole may be further set on the second connecting element 5 to form a fusing member 6. The fusing member 6 may also be set on the first connecting element 4 simultaneously or alternatively. In the short-circuit loop, the resistance value of the fusing member 6 may be configured as a maximum value, such that the short-circuit current may result in a local high temperature at the fusing member 6 to blow out the fusing member 6, so as to disconnect the short-circuit loop and the electricity output loop.

When the power battery is under high temperature environment and the turnable plate 16 has been turned over, the above short-circuit loop will still be generated. In such a situation, due to the overall high ambient temperature rather than the local high temperature, the fusing portion 1042 will be melted in such condition, although the fusing member 6 may not be melted at the local high temperature. Accordingly, the electrical connection between the turnable plate connecting portion 1044 and the terminal connecting portion 1040 will be cut off, and thus the entire short-circuit loop will be disconnected. After the disconnection, no gas or thermal will be generated inside the power battery by the short-circuit current. Therefore, the performance of the power battery under high-temperature environment will be greatly increased.

The fusing portion 1042 may be jointed with the terminal connecting portion 1040 and the turnable connecting portion 1044 by means of mosaicing, soldering, pouring, etc. Also, the melting point of the fusing portion 1042 is to be appropriately selected. If the melting point is too high, it may lead to melting too slow or even not melting, and thus the short-circuit current cannot be cut off in time. If the melting point is too low, it may lead to melting under normal working conditions, so that the power battery cannot be used normally. Therefore, the melting point of the fusing portion 1042 substantially ranges from 80° C. to 200° C., and preferably ranges from 100° C. to 150° C.

Regarding materials, since the resistance value of the fusing portion 1042 cannot exceed the resistance value of the fuse member 6, it is preferable to use a metal material having a low resistance, which is usually a metal alloy composed of at least one or more metal elements with a low melting point, such as bismuth, tin, lead and zinc. Among them, bismuth-based alloys and tin-based alloys are preferred. From the point of view of the overall performance, a bismuth-tin alloy is the most suitable material. The first connecting member 4, the first terminal 100, the terminal connecting portion 1040, the turnable plate connecting portion 1044, the cap plate 14, the turnable plate 16, the second terminal 120, and the second connecting member 5 may be made of copper or aluminum, as long as its melting point is higher than the melting point of the fusing portion 1042.

The fusing portion 1042 flows downward under the force of gravity after being melted. However, since the first upper insulating member 106 is provided below the first connecting block 104, if the melted fusing portion 1042 is obstructed by the first upper insulating member 106, the electrical connection between the terminal connecting portion 1040 and the turnable plate connecting portion 1044 is still remained such that the short-circuit current cannot be completely cut off.

In order to avoid the above problems, referring to FIG. 3 and FIG. 6, the fusing portion 1042 is also positioned above the turnable plate 16 so that the melted fusing portion 1042 flows into the turnable plate connecting hole 140 and is finally blocked by the turnable plate 16, without being retained on the first upper insulating element 106. Therefore, it is possible to effectively prevent the melted fusing portion 1042 from continuing to electrically connect the terminal connecting portion 1040 and the turnable plate connecting portion 1044.

Figure 7:
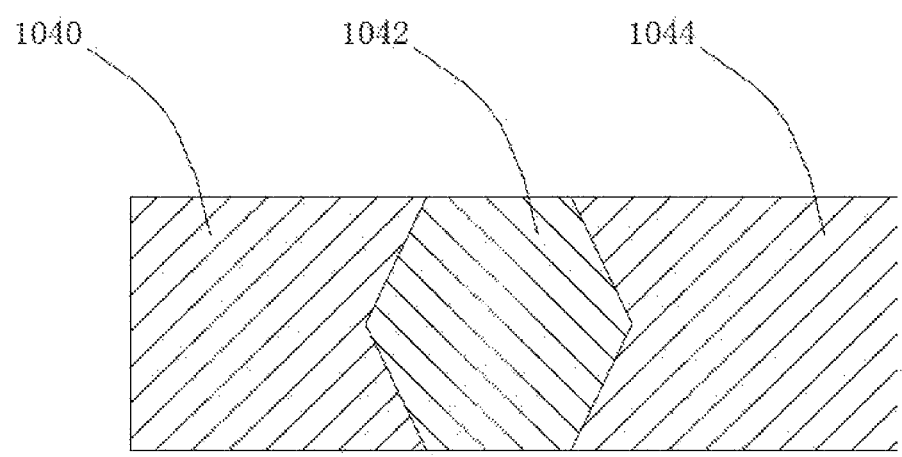
FIG. 7 is a schematic diagram of a partial structure near a fusing portion of a first connecting block with a joint surface of a "V" shape, according to embodiments of the present application.

Since the first connecting block 104 is composed of three parts, it is preferable to have a plurality of first joint surfaces (not shown) between the fusing portion 1042 and the terminal connecting portion 1040 in order to improve the connection strength and the tightness. For the same reason, a plurality of second joint surfaces (not shown) are preferably presented between the fusing portion 1042 and the turnable plate connecting portion 1044. There may be a certain angle between the first joint surfaces or between the second joint surfaces, thereby improving the connection strength between the fusing portion 1042 and the terminal connecting portion 1040, or the connection strength between the fusing portion 1042 and the turnable plate connecting portion 1044. A shape, such as a "V" shape (see FIG. 7), a "Z" shape, a right-angled shape (see FIG. 8), a zigzag shape (see FIG. 9), and the like, may be formed between the first joint surfaces or between the second joint surfaces.

Figure 8:
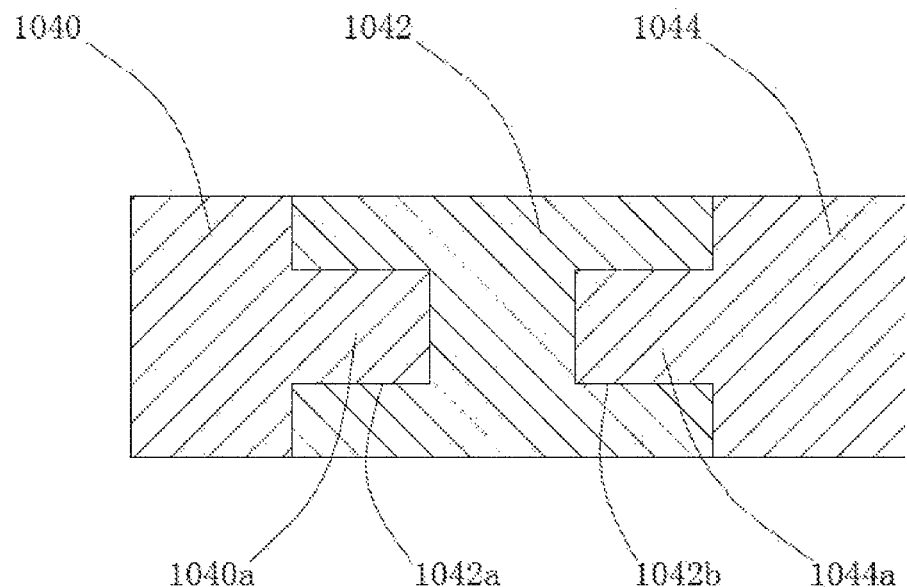
FIG. 8 is a schematic diagram of a partial structure near a fusing portion of a first connecting block with a joint surface of a right-angled shape, according to embodiments of the present application.
Figure 9:
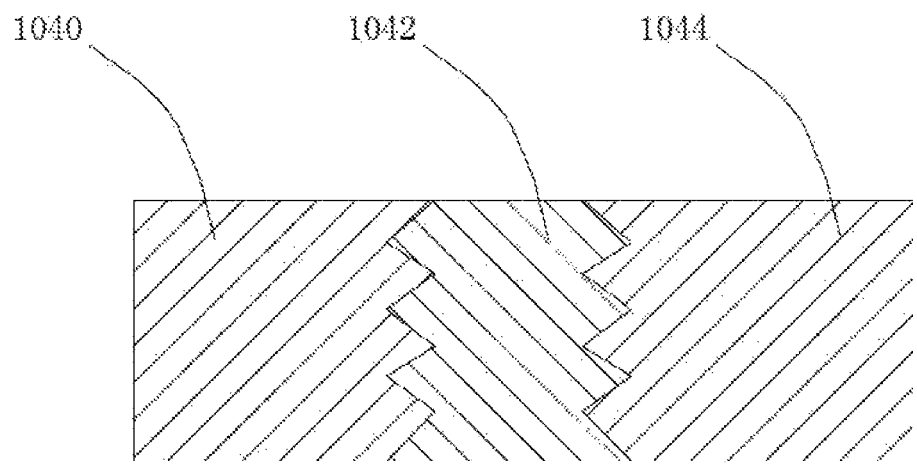
FIG. 9 is a schematic diagram of a partial structure near a fusing portion of a first connecting block with a joint surface of a zigzag shape, according to embodiments of the present application.

Specifically, in the case of a right-angled shape, referring to FIG. 8, several continuous or non-continuous first grooves (or ridges, grooves are shown in FIG. 8 as an example) 1042*a* or second grooves (or ridges, grooves are shown in FIG. 8 as an example) 1042*b* may be provided on the fusing section 1042, while a first ridge (or a groove, the first ridge is shown in FIG. 8 for example) 1040*a* corresponding to the first groove (or ridge) 1042*a* is provided on the terminal connecting portion 1040. Meanwhile, the turnable plate connecting portion 1044 is provided with a second ridge (or a groove, the second ridge is shown in FIG. 8 as an example) 1042*a* and a ridge (or a groove, the ridge is shown in FIG. 8 as an example) 1044*a* corresponding to the second groove (or a ridge) 1042*b*. When the first groove (or ridge) 1042*a* is meshed with the first ridge (or groove) 1040*a*, the aforementioned plurality of first joint surfaces are thus formed. Similarly, when the second groove (or ridge) 1042*b* is meshed with the second ridge (or groove) 1044*a*, the aforementioned plurality of second joint surfaces are thus formed.

At the same time, the first connection block 104 is composed of three parts and the turnable plate 16 exerts an upward force on the turnable plate connecting portion 1044 during the turn-over process. Accordingly, if the force exerted by the turnable plate 16 is too large, the force may cause the turnable plate connecting portion 1044 to be bounced or even ejected. Alternatively, after the fusing portion 1042 is blown out, the turnable plate connecting portion 1044 becomes a separate portion which is likely to be disengaged from the power battery (particularly upward) without a necessary restriction. In order to prevent the above described situation, the present embodiment is provided with a restriction portion 1062 on the first upper insulating member 106. The restriction portion 1062 can be engaged with the turnable plate connecting portion 1044 by means of clamping, pressing, etc., and restrict the turnable plate connecting portion 1044 from moving upwards. In an example, a simple way is to extend a shield 1062 from the first upper insulating member 106 (for ease of understanding, the reference numeral 1062 of the restricting portion is also used for the shield) to cover the turnable plate through hole 1060, and the turnable plate connecting portion extends below the shield 1062. In this way, the shield 1062 can cover the turnable plate connecting portion 1044 to prevent the turnable plate connecting portion 1044 from being bounced by the turnable plate 16.

When the fusing portion 1042 is melted, the first connecting block 104 may be broken into two portions of the terminal connecting portion 1040 and the turnable plate connecting portion 1044, in which the terminal connecting portion 1040 will not have relative movements due to the fixed connection with the first terminal 100, while the turnable plate connecting portion 1044 is only in contact with the turnable plate 16 but not fixed. That is, in some cases such as vibration, shock, etc., the turnable plate connecting portion 1044 is likely to be moved laterally and connected to the terminal connecting portion 1040 to form a short-circuit loop again. Therefore, the present embodiments can fix the turnable plate connecting portion 1044 to the first upper insulating member 106 to avoid the movement of the turnable plate connecting portion 1044. At this time, the shield 1062 is engaged in the fixing of the turnable plate connecting portion 1044, that is to say, the turnable plate connecting portion 1044 is fitted into the area below the shield 1062 of the first upper insulating member 106.

The cap structure provided by the embodiments of the present application not only can solve the overcharge problem of the power battery under normal temperature, but also can reduce the thermal runaway probability of the power battery under high-temperature environment by blowing out the fusing portion under high temperature to cut off the short-circuit current, and thus significantly improve the performance of the power battery under high-temperature environment.

The foregoing descriptions are merely preferred embodiments of the present application and are not intended to limit the present application, and various changes and modifications may be made by those skilled in the art. Any modifications, equivalent substitutions, improvements, and the like within the spirit and principles of the application are intended to be included within the claimed scope of the present application.

What is claimed is:

1. A cap structure of a power battery, comprising a first electrode component, a second electrode component, a cap plate, and a turnable plate, wherein:
    the first electrode component and the second electrode component are attached to the cap plate, and the first electrode component is electrically isolated from the cap plate;
    the first electrode component comprises a first terminal and a first connecting block, the first connecting block is located above the cap plate, the first connecting block comprises a terminal connecting portion, a fusing portion, and a turnable plate connecting portion, the terminal connecting portion is connected to the turnable plate connecting portion through the fusing portion, the first terminal is connected to the terminal connecting portion, the fusing portion has a melting point lower than that of the terminal connecting portion or the turnable plate connecting portion and is positioned above the turnable plate, and the turnable plate is electrically connected to the second electrode component; and
    in case that an internal pressure of the power battery exceeds a reference pressure, the turnable plate is turned over and in contact with the turnable plate connecting portion, such that the first terminal is electrically connected to the second electrode component,
    wherein the second electrode component comprises a second terminal having a turnable plate connecting hole; the turnable plate seals the turnable plate connecting hole and is electrically connected to the second terminal; the cap plate has a turnable plate through hole; the turnable plate connecting portion is located above the turnable plate connecting hole; and the turnable plate connecting hole is aligned with the turnable plate through hole.

2. The cap structure of the power battery of claim 1, wherein when the power battery is assembled with the cap structure, a space within the turnable plate through hole and a space below the turnable plate are independent from each other.

3. The cap structure of the power battery of claim 1, wherein the first electrode component further comprises a first upper insulating element, and the first connecting block is electrically insulated from the cap plate by the first upper insulating element.

4. The cap structure of the power battery of claim 3, wherein the turnable plate connecting portion is fixedly connected to the first upper insulating member.

5. The cap structure of the power battery of claim 3, wherein the first upper insulating member has a restriction portion capable of restricting the turnable plate connecting portion from moving upwards.

6. The cap structure of the power battery of claim 1, wherein the melting point of the fusing portion ranges from 80° C. to 200° C.

7. The cap structure of the power battery of claim 6, wherein the melting point of the fusing portion ranges from 100° C. to 150° C.

8. The cap structure of the power battery of claim 7, wherein the fusing portion is made of a metal alloy at least comprising one or more elements of bismuth, tin, lead and zinc.

9. The cap structure of the power battery of claim 8, wherein the fusing portion is made of a bismuth-based alloy or a tin-based alloy.

10. The cap structure of the power battery of claim 9, wherein the fusing portion is made of a bismuth tin alloy.

11. The cap structure of the power battery of claim 1, wherein:
    a plurality of first joint surfaces exist between the fusing portion and the terminal connecting portion; and/or
    a plurality of second joint surfaces exist between the fusing portion and the turnable plate connecting portion.

12. The cap structure of the power battery of claim 11, wherein:
    one of the fusing portion and the terminal connecting portion has a first groove, the other one has a first ridge corresponding to the first groove, and the first groove and the first ridge corresponding to the first groove are meshed to form the plurality of first joint surfaces between the fusing portion and the terminal connecting portion; and/or
    one of the fusing portion and the turnable plate connecting portion has a second groove, the other one has a second ridge corresponding to the second groove, and the second groove and the second ridge corresponding to the second groove are meshed to form the plurality of second joint surfaces between the fusing portion and the turnable plate connecting portion.

13. The cap structure of the power battery of claim 1, wherein both the fusing portion and the turnable plate connecting portion are located above the turnable plate.

14. A power battery, comprising a housing, a bare cell, and the cap structure of the power battery of claim 1, wherein:
    the housing accommodates the bare cell;
    the cap structure covers an opening of the housing; and
    the bare cell has two electrodes having opposite polarities, one of the two electrodes is electrically connected to the first terminal, and the other one of the two electrodes is electrically connected to the second electrode component.

15. The power battery of claim 14, further comprising a fusing member, which is to be connected in series in an electricity output loop of the power battery when the power battery is electrically connected to external electric equipment.

16. The power battery of claim 15, further comprising a first connecting element and a second connecting element,
wherein one of the two electrodes is electrically connected to the first electrode component through the first connecting element, and the other one of the two electrodes is electrically connected to the second electrode component through the second connecting element; and
wherein the fusing member is formed on the first connecting element and/or the second connecting element.

17. The power battery of claim 16, wherein the fusing member is formed by setting a notch and/or a hole on the first connecting element and/or the second connecting element.

* * * * *